(12) United States Patent
Nash et al.

(10) Patent No.: US 7,144,034 B2
(45) Date of Patent: Dec. 5, 2006

(54) VIBRATION DAMPER GASKET

(75) Inventors: Krista Nash, Ogden, UT (US); Jeremy Visker, West Haven, UT (US)

(73) Assignee: Autoliv ASP, Inc., Ogden, UT (US)

( * ) Notice: Subject to any disclaimer, the term of this patent is extended or adjusted under 35 U.S.C. 154(b) by 127 days.

(21) Appl. No.: 10/781,368

(22) Filed: Feb. 18, 2004

(65) Prior Publication Data

US 2005/0179236 A1  Aug. 18, 2005

(51) Int. Cl.
*B60R 21/16* (2006.01)
(52) U.S. Cl. ............................ 280/728.2; 280/731
(58) Field of Classification Search ............ 280/728.2, 280/731; 267/292, 294, 141.1, 15; 277/637, 277/650, 652, 653, 654, 919, 644
See application file for complete search history.

(56) References Cited

U.S. PATENT DOCUMENTS

| | | | | |
|---|---|---|---|---|
| 4,817,874 | A | * | 4/1989 | Jarzebowicz ............... 239/434 |
| 5,303,952 | A | * | 4/1994 | Shermetaro et al. ........ 280/731 |
| 5,741,025 | A | * | 4/1998 | Meyer et al. ............... 280/731 |
| 5,765,865 | A | * | 6/1998 | Nagata et al. .............. 280/731 |
| 6,164,689 | A | | 12/2000 | Rivin et al. |
| 6,296,416 | B1 | | 10/2001 | Oreans et al. |
| 6,325,411 | B1 | | 12/2001 | Rigner et al. |
| 6,354,622 | B1 | | 3/2002 | Ulbrich et al. |
| 6,361,065 | B1 | | 3/2002 | Frisch |
| 6,398,255 | B1 | | 6/2002 | Scherzinger et al. |
| 6,435,540 | B1 | | 8/2002 | Dürre |
| 6,439,599 | B1 | | 8/2002 | Laue et al. |
| 6,464,247 | B1 | | 10/2002 | Laue |
| 6,592,141 | B1 | | 7/2003 | Dancasius et al. |
| 6,811,181 | B1 | * | 11/2004 | Hauer ....................... 280/731 |
| 2001/0048216 | A1 | | 12/2001 | Varcus et al. |
| 2002/0008362 | A1 | | 1/2002 | Ashtiani et al. |
| 2002/0092699 | A1 | | 7/2002 | Worrell et al. |
| 2002/0125084 | A1 | | 9/2002 | Kreuzer et al. |
| 2002/0140210 | A1 | | 10/2002 | Lovell et al. |
| 2002/0140212 | A1 | | 10/2002 | Hauer |
| 2002/0175500 | A1 | | 11/2002 | Heindl |
| 2003/0038462 | A1 | | 2/2003 | Leibach et al. |
| 2003/0214119 | A1 | | 11/2003 | Grossmann et al. |
| 2004/0004345 | A1 | | 1/2004 | Kayser |
| 2004/0012177 | A1 | | 1/2004 | Sauer |
| 2004/0183278 | A1 | * | 9/2004 | Lorenz et al. .......... 280/728.2 |

FOREIGN PATENT DOCUMENTS

DE   196 53 684   6/1998

(Continued)

*Primary Examiner*—Paul N. Dickson
*Assistant Examiner*—Tiffany L. Webb
(74) *Attorney, Agent, or Firm*—Sally J Brown (57) ABSTRACT

A vibration gasket that is capable of dampening vibrations or movements of a vehicle steering wheel is disclosed. The vibration gasket has a first surface that may be attached to an airbag inflator and a second surface that may be attached to an airbag mounting plate. At least one foil strip is also added to the vibration gasket. The foil strip has an inflator interface area and a mounting plate interface area. The foil strip is constructed such that the inflator interface area may be positioned between the first surface and the inflator. Similarly, the foil strip is also constructed such that the mounting plate interface area may be positioned between the second surface and the mounting plate. Additionally, the vibration gasket may also be used to electrically ground the airbag inflator.

32 Claims, 3 Drawing Sheets

FOREIGN PATENT DOCUMENTS

| | | |
|---|---|---|
| DE | 199 08 915 | 9/2000 |
| DE | 199 08 916 | 9/2000 |
| DE | 199 13 120 | 9/2000 |
| DE | 100 02 480 | 8/2001 |
| EP | 0 994 793 | 4/2000 |
| EP | 1 010 589 | 6/2000 |
| EP | 1 020 332 | 7/2000 |
| EP | 1 026 050 | 8/2000 |
| EP | 1 065 110 | 1/2001 |
| EP | 1 101 662 | 5/2001 |
| EP | 1 101 663 | 5/2001 |
| EP | 1 136 328 | 9/2001 |
| JP | 56038364 A * | 4/1981 |

* cited by examiner

VIBRATION DAMPER GASKET

BACKGROUND OF THE INVENTION

1. Field of the Invention

The present invention relates to a novel vibration gasket. More specifically, the present invention relates to a novel vibration gasket that may also be used to electrically ground an airbag inflator.

2. Description of Related Art

It is well known that the operation of a motor vehicle often causes vibrations in the vehicle's steering wheel. Such steering wheel vibrations are usually caused by an improper alignment of the vehicle's wheels. Of course, other factors such as tire pressure and engine vibrations (especially in diesel-fueled vehicles) may also contribute to the vibrations in the steering wheel.

Generally, vibrations of the steering wheel will not cause any structural damage to the vehicle. However, such vibrations in the steering wheel can pose significant safety concerns because vehicles having large vibrations in the steering wheel are more difficult to steer and control than are other vehicles. Furthermore, vibrations in the steering wheel are often very distracting and may prevent the vehicle driver from focusing his or her attention on the roadway. As a result, the likelihood that an accident or crash will occur is greatly increased.

In order to minimize the problems associated with steering wheel vibrations, modern steering wheels are constructed to include a vibration dampener or other similar mechanism that is capable of reducing/dampening steering wheel vibrations. Many known vibration dampers consist of an attenuation mass (usually made of metal) that engages and/or is mounted within an elastic member. The elastic member is sometimes referred to as a "vibration gasket." As is know in the art, the vibration damper is positioned and configured such that when a vibration is transmitted to the steering wheel, the attenuation mass and the vibration gasket will impart a force onto the steering wheel. Such an imposition of a force onto the steering wheel resists movement and operates to dampen the vibrations of the steering wheel.

Recently, new vibration dampers have been constructed which are designed for use with the steering wheel's airbag module. These new dampers function in the same manner as the traditional damper. However in these new dampers, the airbag inflator and/or other portions of the airbag module are used as the attenuation mass. The vibration gasket is then positioned aft of the inflator such that it encircles and/or engages a portion of the inflator and/or the airbag module.

By using the airbag inflator as the attenuation mass in the vibration damper, the overall number of components required to produce the steering wheel is decreased. At the same time however, these new vibration dampers present additional concerns for vehicle, airbag, and/or steering wheel manufacturers. For example, using the inflator as the attenuation mass makes it more difficult to electrically ground the airbag inflator. Electrical grounding of the inflator is necessary in order to ensure that an unexpected electrical current within the inflator (such as from lightning or other sources) does not cause the inflator to accidentally discharge and inflate the airbag. Such grounding of the inflator is accomplished very quickly by attaching or welding a ground wire to the inflator. However, when the inflator is used as the attenuation mass, such attachment of the ground wire may be blocked by the damper's vibration gasket. As such, manufacturers may be forced to use more expensive and/or time-consuming methods for electrically grounding the airbag inflator.

Furthermore, many known vibration dampers are further designed such that the size and shape of the vibration gasket cannot be adjusted. On the contrary, these vibration dampers are designed such that the size and shape of the vibration gasket must correspond to the size and the shape of the inflator. This inability to adjust the size and shape of the gasket is a significant disadvantage because it prevents the manufacture from tuning the gasket to optimize the dampening of the steering wheel module.

Accordingly, there is a need in the art for a novel vibration gasket that addresses and/or solves one or more of the above-listed problems. Such a device is disclosed herein.

BRIEF SUMMARY OF THE INVENTION

The apparatus of the present invention has been developed in response to the present state of the art, and in particular, in response to the problems and needs in the art that have not yet been fully solved by currently available vibration gaskets. Thus, the present invention comprises a vibration gasket that may be mounted onto a steering wheel. The vibration gasket is configured to dampen the vibrations and/or movement of the steering wheel.

The vibration gasket may be used in conjunction with a vehicle airbag module that has an inflator and an airbag. As is known in the art, the inflator may include an inflator flange that extends radially outward from a portion of the inflator. The airbag module may also be attached to a mounting plate. The mounting plate is a metal plate that is designed to attach the module to the steering wheel. More specifically, the mounting plate is a metal plate that, in turn, may be mounted to a portion of the steering wheel to secure and hold the airbag module within the steering wheel. In other embodiments, the mounting plate may comprise a portion of the steering wheel to which the airbag module may be attached.

The vibration gasket may be positioned between the mounting plate and a bottom surface of the inflator flange. The vibration gasket includes a first surface and a second surface. The first surface may be positioned above the second surface. The vibration gasket is designed such that the first surface is attachable to the inflator. In some embodiments, the first surface is attachable to the inflator via the inflator flange. The second surface is also constructed such that it may be attached to the mounting plate.

A first adhesive and a second adhesive may also be added to the vibration gasket. The first adhesive is positioned on the first surface whereas the second adhesive is positioned upon the second surface. The vibration gasket is constructed such that the first surface is attachable to the inflator via the first adhesive. More specifically, the vibration gasket is constructed such that the first surface is attachable to the inflator flange via the first adhesive. The second surface is also attachable to the mounting plate via the second adhesive.

In some embodiments, the first adhesive and the second adhesive may both be high bond adhesives. Such high bond adhesives are electrically non-conductive (i.e., they do not conduct electricity). Of course, other embodiments of the present invention may also be constructed in which other materials and/or devices are used as the first adhesive and/or the second adhesive.

The vibration gasket includes at least one foil strip that wraps around a portion of the gasket. In some embodiments, two foil strips are used. The foil strips operate to electrically ground the inflator. The foil strips comprise an inflator interface area, which is a portion or section of the foil strip that is sized and configured such that it may be positioned between the first surface and the inflator. Further embodiments may also be made in which the inflator interface area is positioned between the first surface and the inflator flange.

The inflator interface area may be positioned at a first end of the foil strips. The inflator interface area is designed such that it may be positioned and/or held between the first surface and the inflator flange without the use of adhesives or other attachment means. Of course, other embodiments may also be constructed in which the inflator interface area is constructed differently. For example, embodiments may be constructed in which the inflator interface area is positioned and/or held between the first surface and the inflator flange by a first electrically conductive adhesive or other attachment means.

The foil strips also comprise a mounting plate interface area. The mounting plate interface area is a portion or section of the foil strip that is sized and configured such that it may be positioned between the second surface and the mounting plate. In some embodiments, the mounting plate interface area may be positioned at a second end of the foil strips.

The mounting plate interface area is further designed such that it may be positioned and/or held between the second surface and the mounting plate without the use of adhesives or other attachment means. Of course, other embodiments may also be constructed in which the mounting plate interface area is positioned and/or held between the second surface and the mounting plate by a second electrically conductive adhesive or other attachment means.

As noted above, the foil strips operate to electrically ground the inflator. Specifically, when the airbag module and the vibration gasket are attached to a steering wheel, the inflator interface area contacts the inflator and/or the inflator flange. Similarly, the mounting plate interface area contacts the mounting plate. Such contact between the inflator, the foil strips, and the mounting plate electrically grounds the inflator because any electrical current that is found within the inflator may flow through the foil strips into the mounting plate and/or other portions of the steering wheel.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 2:
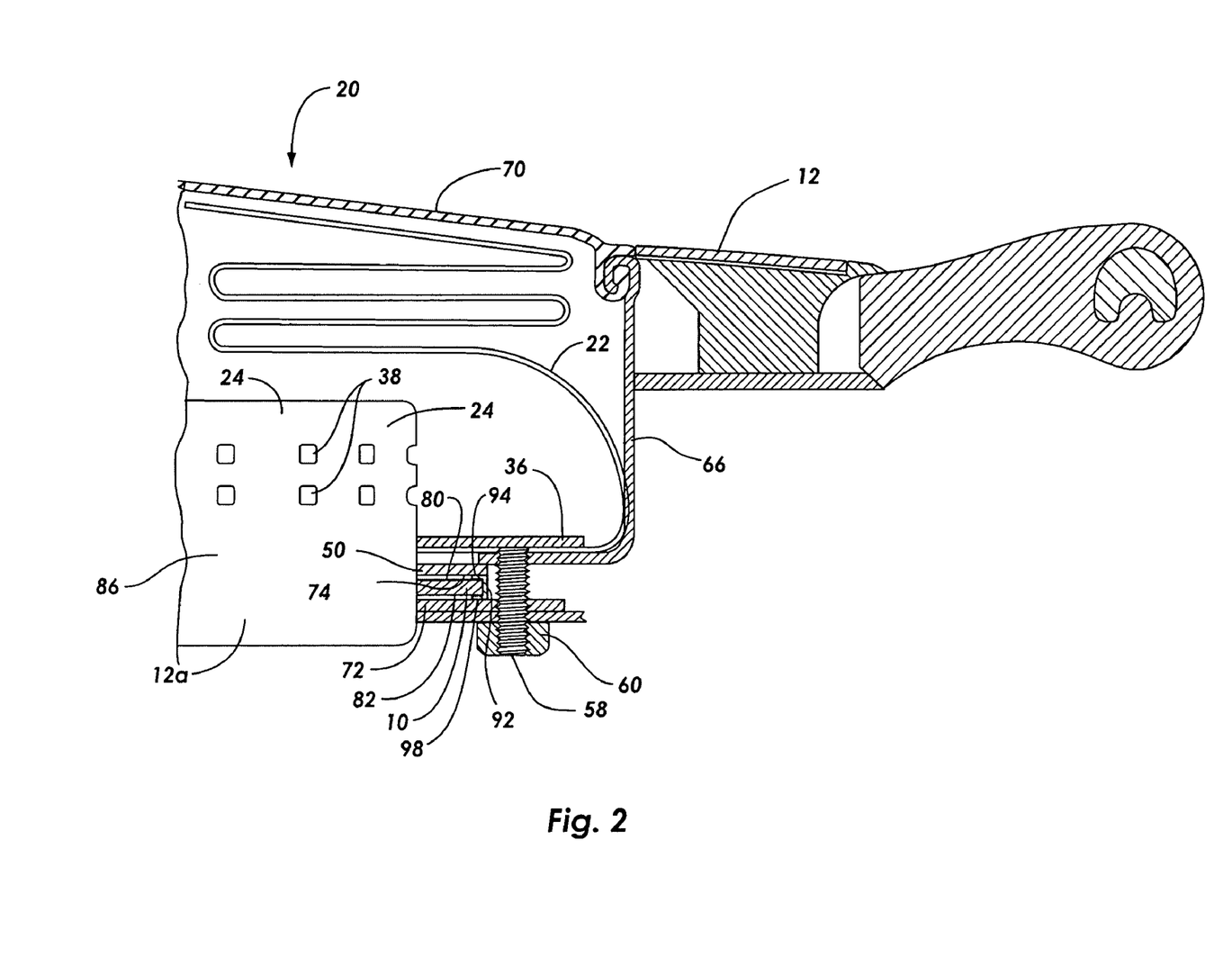
FIG. 2 is a cross-sectional view that shows the vibration gasket and the airbag module of FIG. 1 mounted onto a vehicle's steering wheel.
Figure 3:
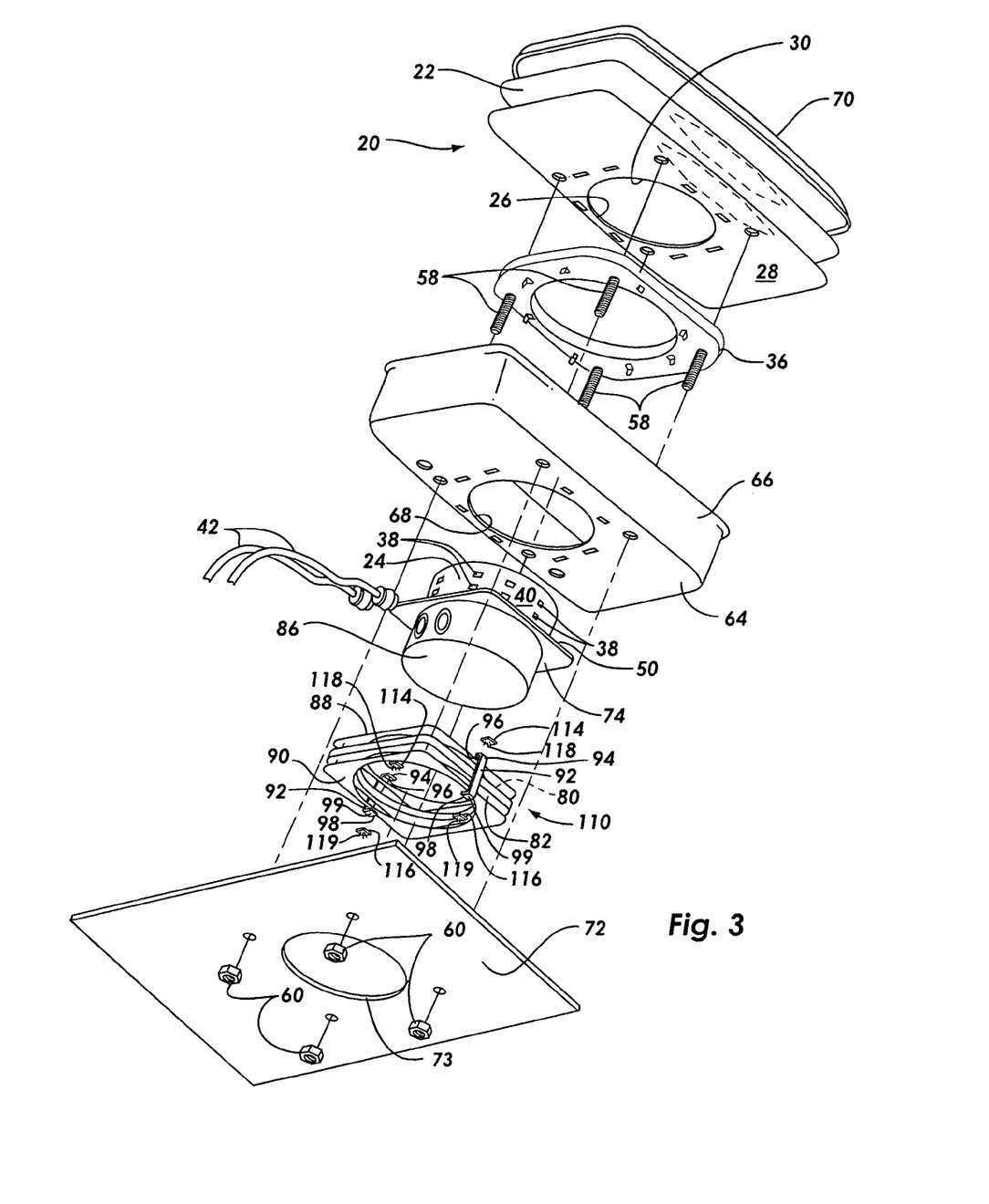
FIG. 3 is an assembly view of an airbag module including an airbag and an inflator, and further illustrating additional embodiment of a vibration gasket according to the present invention that is used in conjunction with the airbag module.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of presently preferred embodiments of the invention.

Figure 1:
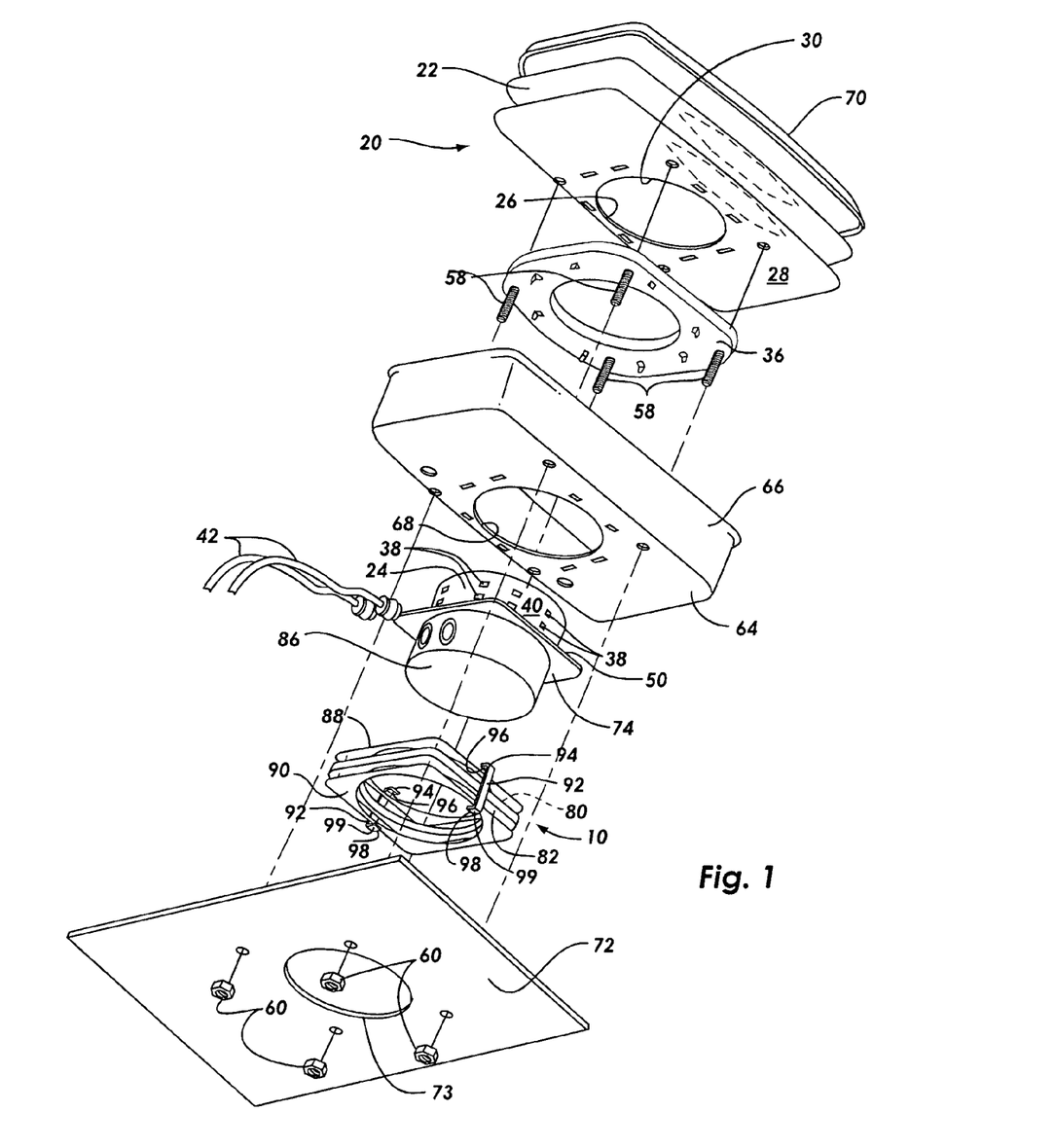
FIG. 1 is an assembly view of an airbag module including an airbag and an inflator, and further illustrating a vibration gasket according to the present invention that may be used in conjunction with the airbag module.

Referring now to FIG. 1, one embodiment of a vibration gasket 10 according to the present invention is illustrated. The vibration gasket 10 is configured such that it may be mounted onto a vehicle steering wheel 12 (shown in FIG. 2). The vibration gasket 10 is designed such that it is capable of dampening the vibrations and/or movements of the steering wheel 12.

The vibration gasket 10 is used in conjunction with an airbag module 20 having an airbag 22 and an inflator 24. The airbag module 20 is constructed to inflate and deploy the airbag 22 in the event of a crash or accident. More specifically, the airbag module 20 is constructed such that if a crash or accident occurs, the inflator 24 will inflate and deploy the airbag 22 into a position that protects a vehicle occupant (not shown) from harmful impact with the steering wheel 12 and/or other portions of the vehicle interior (not shown).

The airbag module 20 shown in FIG. 1 illustrates one embodiment of an airbag system that may be used in conjunction with the vibration gasket 10 of the present invention. However, those of skill in the art will recognize that other types of airbag systems may also be used with the gasket 10. Particularly, other embodiments may also be made in which one or more of the features and elements of the airbag module 20 differ from that which is depicted in FIG. 1.

As shown in FIG. 1, the airbag module 20 includes an airbag 22 having an inner surface 26 and an outer surface 28. The airbag 22 is capable of receiving a supply of inflation gas from the inflator 24. In order to facilitate the transfer of inflation gas from the inflator 24 to the airbag 22, the airbag may additionally include a mouth 30 that fits around all or a portion of the inflator 22.

A retaining collar 36 may also be positioned proximate the inner surface 26 of the airbag 22. The collar 36 is positioned adjacent to the mouth 30. Specifically, the retaining collar 36 is secured about the inflator 22 to retain the airbag 22 in communication with the inflator 24.

The inflator 24 includes a plurality of openings 38 circumferentially spaced about an outer surface 40 of the inflator 24 through which the inflation gas is directed out of the inflator 24. The inflator 24 is a pyrotechnic assembly in which a measured quantity of generant (not shown), or pyrotechnic material, is stored within the inflator 24. The inflator 24 also includes means for activating the gas generant (not shown) which in a preferred embodiment are a pair of connector leads 42. An accelerometer (not shown)

detects improper deceleration of the vehicle. Once this deceleration is detected, a signal is sent through the connector leads 42 into the inflator 24. This signal triggers a reaction within the inflator 24, which in turn, produces the inflation gas for inflating the airbag 22.

The inflator 20 includes an inflator flange 50 that extends radially outward from a portion of the inflator 24. The flange 50 may include a clamping surface (not shown) to facilitate capturing the airbag 22 between the retaining collar 36 and the flange 50. Additionally, a plurality of fasteners 58 may be attached to the retaining collar 36. As shown in FIG. 1, four fasteners 58 have been added. The fasteners 58 are designed such that the retaining collar 36 may hold the airbag 22 and the other parts of the airbag module 20 in their proper configuration within the mouth 30. Nuts 60 or other devices may also be secured to the fasteners 58.

The airbag module 20 may also include a mounting base member 64 to which the airbag 22 is attached. In one embodiment, the mounting base member 64 is part of a housing 66 for retaining the inflatable airbag 22 in a folded state. The housing 66 may include an opening 68 configured to substantially match or receive the cylindrical shape of the inflator 24. In the embodiment illustrated in FIG. 1, the housing 66 is clamped, along with the mouth 30 of the airbag 22 between the retaining collar 36 and the flange member 50 of the inflator 24. The housing 66 may also include a lid member 70 which can be secured about the housing 66 once the folded airbag 22 is folded within the housing 70. In other embodiments, the lid member 70 may be integral with the housing 66.

The retaining collar 36 is positioned adjacent the inner surface 26 of the airbag 22 at the mouth 30 and about the outer surface 40 of the inflator 24. It will be appreciated that the circular shape mouth 30 is configured to closely approximate the outer surface 40 of the inflator 24. The outer surface 40 of the inflator 24 may be configured in a variety of different configurations to provide even inflation of the airbag 22 and consequently, the corresponding configuration of the mouth 30 may also be one of a number of configurations.

The airbag module 20 may also be attached to an airbag mounting plate 72. As shown in FIG. 1, this attachment is accomplished via the nuts 60 and the fastener 58. The mounting plate 72 is a metal plate that is designed to attach the module 20 to the steering wheel 12. The mounting plate 72 may also include an orifice 73 that is designed to receive a bottom portion 86 of the inflator 24.

As shown in FIG. 1, the mounting plate 72 is a metal plate that, in turn, may be mounted to a portion of the steering wheel 12 to secure and hold the airbag module 20 within the steering wheel 12. In other embodiments, the mounting plate 72 may comprise a portion of the steering wheel 12 to which the airbag module 20 may be attached.

Referring still to FIG. 1, the vibration gasket 10 may be positioned between the mounting plate 72 and a bottom surface 74 of the inflator flange 50. The vibration gasket 10 includes a first surface 80 and a second surface 82. The first surface 80 may be positioned above the second surface 82. The vibration gasket 10 is designed such that the first surface 80 is attachable to the inflator 24 and the second surface 82 is attachable to the mounting plate 72. As shown in FIG. 1, the vibration gasket 10 is designed such that the first surface 80 is attachable to the inflator flange 50.

The vibration gasket 10 that is shown in FIG. 1 is ring-shaped and is sized to encircle and/or engage the bottom portion 86 of the inflator 24. However, other embodiments may also be made in which the vibration gasket 10 does not encircle and/or engage the bottom portion 86. Still other embodiments may be constructed in which the shape and/or the thickness of all or a portion of the vibration gasket 10 differs from that which is shown in FIG. 1. For example, other embodiments may be constructed in which the vibration gasket 10 is oval or elliptical in shape. Additional embodiments may be made in which the vibration gasket is shaped like a gear and/or has one or more sprockets. Yet further embodiments may construct be made in which the vibration gasket 10 has any other regular or irregular shape.

The vibration gasket 10 shown in FIG. 1 is made from a cellular urethane material. One example of a cellular urethane material that may be used to construct the vibration gasket 10 is PORON®, which is a product commercially available from the Rogers Corporation of Woodstock, Conn., U.S.A. Of course, other types of cellular urethane materials may also be used to construct the gasket 10. Yet further embodiments may also be constructed in which the vibration gasket 10 is made of elastomeric materials or other materials.

A first adhesive 88 and a second adhesive 90 may also be added to the vibration gasket 10. The first adhesive 88 is positioned on the first surface 80 whereas the second adhesive 90 is positioned upon the second surface 82. The vibration gasket 10 is constructed such that the first surface 80 is attachable to the inflator 24 via the first adhesive 88. More specifically, the vibration gasket 10 is constructed such that the first surface 80 is attachable to the inflator flange 50 via the first adhesive 88. The second surface 82 is also attachable to the mounting plate 72 via the second adhesive 90.

In the embodiment shown in FIG. 1, the first adhesive 88 and the second adhesive 90 are both high bond adhesives. Such high bond adhesives may be obtained from the 3M Company Corporation of St. Paul, Minn., U.S.A., or a variety of other known suppliers. As will be described in greater detail below, these high bond adhesives are electrically non-conductive (i.e., they do not conduct electricity). Of course, other embodiments of the present invention may also be constructed in which other materials and/or devices are used as the first adhesive 88 and/or the second adhesive 90. Still further embodiments may be constructed in which the first adhesive and/or the second adhesive are contact adhesives.

The vibration gasket 10 includes at least one foil strip 92 that wraps around a portion of the gasket 10. As shown in FIG. 1, two foil strips 92 have been added to the gasket 10. The foil strips 92 operate to electrically ground the inflator 24. Accordingly, the foil strips 92 are made of an electrically conductive metal such as copper, aluminum, and the like. Alloys of metals and/or plated metals (such as tin plated copper) may also be used to form the foil strips 92.

Each of the foil strips 92 comprises an inflator interface area 94. The inflator interface area 94 is a portion or section of the foil strip 92 that is sized and configured such that it may be positioned between the first surface 80 and the inflator 24. In the embodiment shown in FIG. 1, the inflator interface area 94 is sized and configured such that it may be positioned between the first surface 80 and the inflator flange 50. The inflator interface area 94 is further constructed such that it may contact the inflator 24 and/or the inflator flange 50 such that an electrical current may flow from the inflator 24 into the foil strip 92.

As illustrated in FIG. 1, the inflator interface area 94 is positioned at a first end 96 of the foil strips 92 and is designed such that it may be positioned and/or held between the first surface 80 and the inflator flange 50 without the use of adhesives or other attachment means. Of course, other embodiments may also be constructed in which the inflator interface area 94 is constructed differently. For example, embodiments may be constructed in which the inflator interface area 94 is positioned and/or held between the first surface 80 and the inflator flange 50 by an electrically conductive adhesive or other attachment means that is capable of conducting an electrical current. Other embodiments may be constructed in which the inflator interface area 94 is positioned anywhere along the longitudinal length of the foil strip 92.

The foil strips 92 also comprise a mounting plate interface area 98. The mounting plate interface area 98 is a portion or section of the foil strip 92 that is sized and configured such that it may be positioned between the second surface 82 and the mounting plate 72. The mounting plate interface area 98 is further constructed such that it may contact the mounting plate 72 such that an electrical current may flow from the foil strip 92 and into the mounting plate 72.

As illustrated in FIG. 1, the mounting plate interface area 98 is positioned at a second end 99 of the foil strips 92. The mounting plate interface area 98 is further designed such that it may be positioned and/or held between the second surface 82 and the mounting plate 72 without the use of adhesives or other attachment means. Of course, other embodiments may also be constructed in which the mounting plate interface area 98 is positioned and/or held between the second surface 82 and the mounting plate 72 by an electrically conductive adhesive or other attachment means that is capable of conducting an electrical current. Other embodiments may be constructed in which the mounting plate 72 interface area 98 is positioned anywhere along the longitudinal length of the foil strip 92.

FIG. 2 is a cross-sectional view in which the airbag module 20 and the vibration gasket 10 of FIG. 1 have been mounted onto a vehicle steering wheel 12. As shown in FIG. 2, such mounting may be accomplished by attaching the mounting plate 72 to a portion of the steering wheel frame 12a via the fasteners 58. Of course, those of skill in the art will recognize that other methods for mounting the airbag module 20 and the vibration gasket 10 may also be used. For example, embodiments may be constructed in which the fasteners 58 are not used to attach the mounting plate 72 to the steering wheel frame 12a. Rather, in these embodiments, one or more additional fasteners and/or additional attachment means are used to connect the mounting plate 72 to the frame 12a. Still further embodiments may be constructed in which the mounting plate 72 comprises a portion of the steering wheel frame 12a.

As depicted in FIG. 2, the vibration gasket 10 may be designed such that when the vibration gasket 10 and the airbag module 20 are positioned onto the steering wheel 12, the vibration gasket 10 encircles and/or engages a bottom portion 86 of the inflator 24. Accordingly, when the steering wheel 12 experiences a vibration and/or movement, the inflator 24 and the gasket 10 will resist movement and will dampen the overall vibration/movement of the steering wheel 12. Further embodiments may also be made in which the size, shape, and/or configuration of the vibration gasket 10 is modified in order to adjust and/or optimize the ability of the vibration gasket 10 to dampen the vibration/movement of a particular type of steering wheel 12.

The manner by which the vibration gasket 10 operates to electrically ground the inflator 24 is also illustrated in FIG. 2. Specifically, when the airbag module 20 and the vibration gasket 10 are attached to a steering wheel 12, the inflator interface areas 94 contact the inflator 24 and/or the inflator flange 50 whereas the mounting plate interface areas 98 contact the mounting plate 72. Such contact between the inflator 24, the foil strips 92, and the mounting plate 72 electrically grounds the inflator 24 because any electrical current that is found within the inflator 24 may flow through the foil strips 92 into the mounting plate 72 and/or other portions of the steering wheel 12.

Referring now to FIG. 3, an assembly view of an additional embodiment of the present invention is depicted. FIG. 3 shows a vibration gasket 110 that is used in conjunction with the airbag module 20. Like the embodiment described above, the vibration gasket 110 may be positioned onto a steering wheel 12 (shown in FIG. 2) and used to dampen vibrations and/or movement of the steering wheel 12.

The vibration gasket 110 may include all of the features and elements that are found on the vibration gasket 10 that is described above. The difference between the vibration gasket 110 shown in FIG. 3 and the vibration gasket 10 described above is that the vibration gasket 110 additionally comprises a first electrically conductive adhesive 114 and a second electrically conductive adhesive 116. The first electrically conductive adhesive 114 is positioned on the inflator interface area 94 and the second electrically conductive adhesive 116 is positioned on the mounting plate interface area 98.

In the embodiment shown in FIG. 3, the first electrically conductive adhesive 114 operates to bond and/or attach the inflator interface area 94 to the inflator 24 and/or the inflator flange 50. Likewise, the second electrically conductive adhesive 116 operates to bond and/or attach the mounting plate interface area 94 to the mounting plate 72. Of course, other embodiments may be constructed in which the mechanism and/or methods for attaching the inflator interface area 94 to the inflator 24 and/or the inflator flange 50 differ from that which is shown in FIG. 3. Similarly, further embodiments may be constructed in which the mechanism and/or methods for attaching the mounting plate interface area 94 to the mounting plate 72 differ from that which is shown in FIG. 3.

As shown in FIG. 3, the first electrically conductive adhesive 114 and second electrically conductive adhesive 116 are both contact adhesives. The first electrically conductive adhesive 114 and the second electrically conductive adhesive 116b are also both constructed such that they are capable of conducting and/or transmitting an electrical current. In the embodiment shown in FIG. 3, this is accomplished by having the first electrically conductive adhesive 114 include one or more first conductive fibers 118 and by having the second electrically conductive adhesive 116 include one or second conductive fibers 119. As is known in the art, the fibers 118, 119 are constructed of metal and the like and are designed such that current may flow through the adhesives 114, 116 by passing through the fibers 118, 119.

Referring still to FIG. 3, the vibration gasket 110 is constructed such that when the airbag module 20 and the vibration gasket 110 are attached to a steering wheel 12 (shown in FIG. 2), the vibration gasket 110 will encircle and/or engage a bottom portion 86 of the inflator flange 50. At the same time, the vibration gasket 110 will be bonded to the inflator 24 and the mounting plate 72. Specifically, the inflator interface 94 will be bonded to the inflator 24 and/or the inflator flange 50 via the first electrically conductive adhesive 114 whereas the mounting plate interface area 98 will bonded to the mounting plate 72 via the second electrically conductive adhesive 116.

The manner in which the vibration gasket 110 operates to electrically ground the inflator 24 will now be described. If an electrical current enters or is found in the inflator 24, the current can flow out of the inflator 24 by passing through the conductive fibers 118 found in the first electrically conductive adhesive 114. Once the current flows through the fibers 118, the current may then flow through the foil strips 92. After the current reaches the end of the foil strips 92, the current may then flow through the second conductive fibers 119 and into the mounting plate 72, the steering wheel frame 12a, and/or other portions of the steering wheel 12. In turn, such flow of current along this flow path ensures that the electrical current is not held within the inflator 24 and operates to electrically ground the inflator 24.

Referring now to FIGS. 1 through 3 generally, the present invention also provides for a novel method of dampening the vibrations and/or movements of a vehicle steering wheel 12. The method involves obtaining at least one vibration gasket 10, 110 according to the present invention. Once the gasket 10, 110 is obtained, the gasket 10, 110 is installed onto the steering wheel 12. In some embodiments, this installing step is accomplished by positioning the gasket 10, 110 such that the gasket 10, 110 encircles and/or engages a bottom portion 86 of an airbag inflator 24.

The method of the present invention may additionally comprise the step of tuning the gasket 10, 110 to provide optimal dampening of the vibrations and/or movements of the steering wheel 12. In some embodiments, such tuning of the gasket 10, 110 may involve adjusting the size and/or shape of the gasket 10, 110. Of course other methods of tuning the gasket 10, 110 may also be used. Still further embodiments may involve testing the gasket 10, 110 to determine what size, shape, and/or configuration of the gasket 10, 110 provides optimal dampening of the vibrations and/or movements of the steering wheel 12.

In summary, the present invention provides a novel vibration gasket that may be used to dampen the vibrations and/or movement of a steering wheel. As such, many of the limitations associated with known vibration gaskets are effectively eliminated.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An airbag module vibration gasket comprising:
   a first surface that is attachable to an airbag inflator;
   a second surface that is attachable to an airbag mounting plate, the first surface being disposed above the second surface; and
   at least one foil strip having an inflator interface area and a mounting plate interface area, the inflator interface area being positionable between the first surface and the inflator, the mounting plate interface area being positionable between the second surface and the mounting plate.

2. A vibration gasket as in claim 1 wherein the gasket is designed to encircle a bottom portion of the inflator.

3. A vibration gasket as in claim 1 wherein the first surface is attachable to the inflator via a first adhesive.

4. A vibration gasket as in claim 3 wherein the first adhesive is electrically non-conductive.

5. A vibration gasket as in claim 4 wherein the first adhesive is a contact adhesive.

6. A vibration gasket as in claim 1 wherein the second surface is attachable to the mounting plate via a second adhesive.

7. A vibration gasket as in claim 6 wherein the second adhesive is an electrically non-conductive adhesive.

8. A vibration gasket as in claim 7 wherein the second adhesive is a contact adhesive.

9. A vibration gasket as in claim 1 wherein the first surface is attachable to the inflator via a first adhesive and the second surface is attachable to the mounting plate via a second adhesive.

10. A vibration gasket as in claim 1 wherein the inflator interface area is bonded to the inflator via a first electrically conductive adhesive.

11. A vibration gasket as in claim 10 wherein the first electrically conductive adhesive is a contact adhesive.

12. A vibration gasket as in claim 1 wherein the mounting plate interface area is bonded to the mounting plate via a second electrically conductive adhesive.

13. A vibration gasket as in claim 12 wherein the second electrically conductive adhesive is a contact adhesive.

14. A vibration gasket as in claim 1 wherein the inflator interface area is bonded to the inflator and the mounting plate interface area is bonded to the mounting plate.

15. A vibration gasket as in claim 1 wherein the foil strip wraps around a portion of the gasket.

16. A vibration gasket as in claim 1 wherein the foil strip is made of an electrically conductive metal.

17. A vibration gasket as in claim 1 wherein the foil strip operates to electrically ground the inflator.

18. A vibration gasket as in claim 1 wherein the gasket is made of a cellular urethane material.

19. A vibration gasket as in claim 1 wherein the gasket is made of a elastomeric material.

20. An airbag module vibration gasket comprising:
    a first surface that is attachable to an airbag inflator via the inflator flange;
    a second surface that is attachable to an airbag mounting plate, the first surface being disposed above the second surface; and
    at least one foil strip having an inflator interface area and a mounting plate interface area, the inflator interface area being positionable between the first surface and the inflator, the mounting plate interface area being positionable between the second surface and the mounting plate.

21. A vibration gasket as in claim 20 wherein the first surface is attached to the inflator flange via a first adhesive.

22. A vibration gasket as in claim 20 wherein the second surface is attached to the mounting plate via a second adhesive.

23. A vibration gasket as in claim 20 wherein the first surface is attached to the inflator flange via a first adhesive and the second surface is attached to the mounting plate via a second adhesive.

24. A vibration gasket as in claim 23 wherein the first adhesive and the second adhesive are electrically non-conductive.

25. A vibration gasket as in claim 23 wherein the first adhesive and the second adhesive are contact adhesives.

26. A vibration gasket as in claim 20 wherein the inflator interface area is attached to the inflator flange via a first electrically conductive adhesive.

27. A vibration gasket is claim 26 wherein the first electrically conductive adhesive comprises one or more fibers.

28. A vibration gasket as in claim 20 wherein the mounting plate interface area is attached to the mounting plate via a second electrically conductive adhesive.

29. A vibration gasket as in claim 28 wherein the second electrically conductive adhesive comprises one or more fibers.

30. A vibration gasket as in claim 20 wherein the at least one foil strip operate to electrically ground the inflator.

31. A vibration gasket as in claim 20 wherein the gasket is made of a cellular urethane material.

32. A vibration gasket as in claim 20 wherein the gasket includes two foil strips that wrap around a portion of the gasket.

\* \* \* \* \*

UNITED STATES PATENT AND TRADEMARK OFFICE
CERTIFICATE OF CORRECTION

PATENT NO. : 7,144,034 B2  
APPLICATION NO. : 10/781368  
DATED : December 5, 2006  
INVENTOR(S) : Krista Nash et al.

Page 1 of 1

It is certified that error appears in the above-identified patent and that said Letters Patent is hereby corrected as shown below:

In column 1, line 31, please delete "modem steering wheels" and replace with --modern steering wheels--.

Signed and Sealed this

First Day of April, 2008

JON W. DUDAS  
*Director of the United States Patent and Trademark Office*